Sept. 3, 1957 H. HILBER 2,804,865
GEAR FOR SINGLE-TRACK VEHICLES
Filed June 24, 1954 2 Sheets-Sheet 1
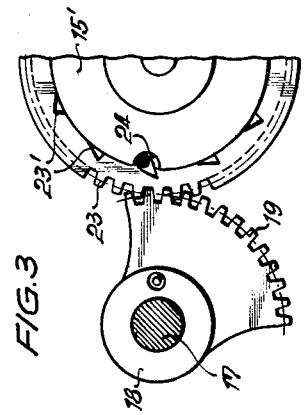
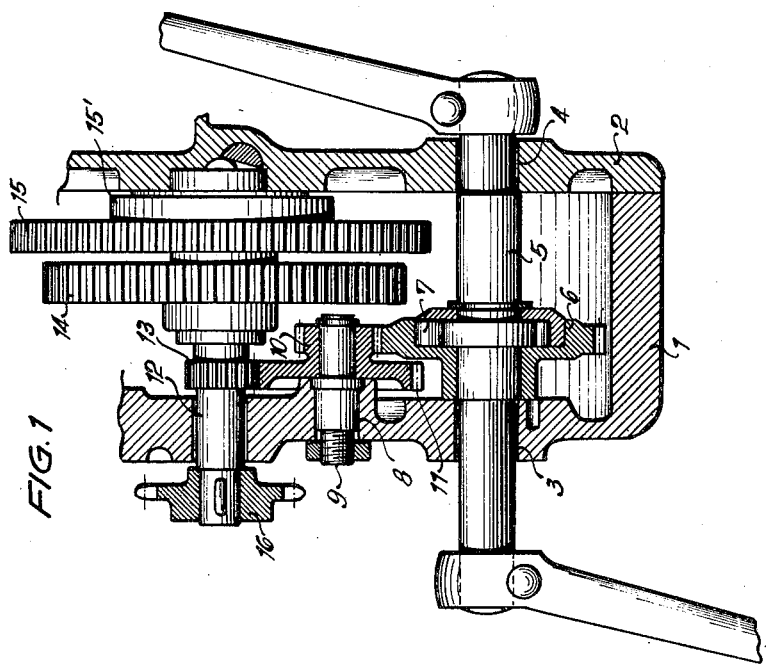
INVENTOR
Hannes Hilber
By Ernest G. Montague
Attorney Sept. 3, 1957 H. HILBER 2,804,865
GEAR FOR SINGLE-TRACK VEHICLES
Filed June 24, 1954 2 Sheets-Sheet 2
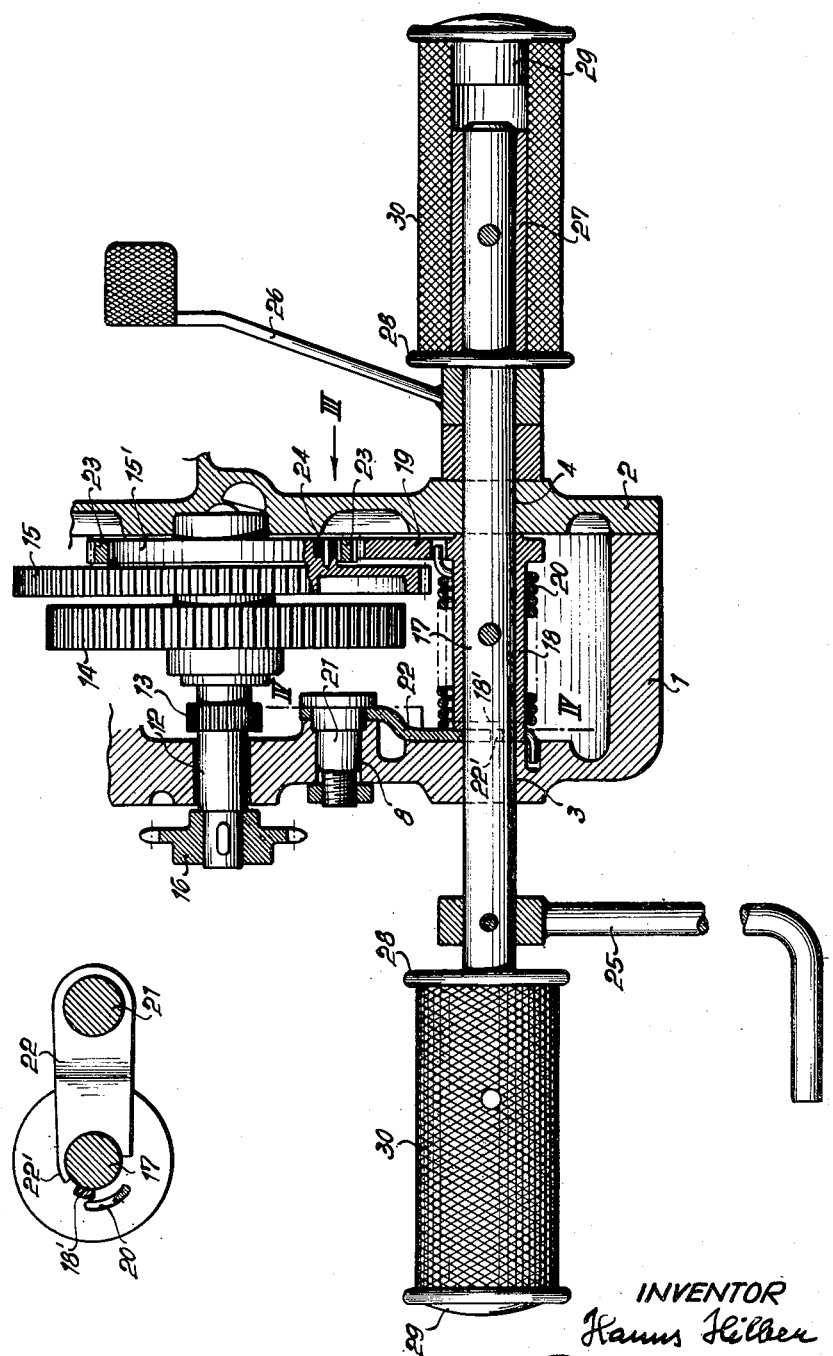
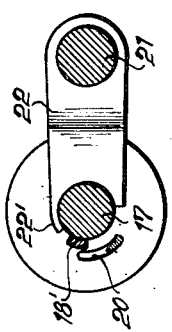
INVENTOR
Hanns Hilber
By Ernest G. Montague
Attorney

United States Patent Office 2,804,865
Patented Sept. 3, 1957

2,804,865

GEAR FOR SINGLE-TRACK VEHICLES

Hanns Hilber, Stuttgart, Germany, assignor to Alfred Kreidler, Stuttgart, Germany Application June 24, 1954, Serial No. 438,938

Claims priority, application Germany June 26, 1953

2 Claims. (Cl. 123—185)

The invention relates to a gear for single-track vehicles which may be optionally constructed as, or converted into, an engine-assisted pedal cycle having a pedal crank, or a light motorcycle having footrests.

It is an object of the present invention to provide a gear which is to be fitted with bearings for receiving, as required, a pedal crank drive or a spindle carrying the footrests and/or forming the kickstarter shaft.

It is another object of the present invention to provide, as a further development of the idea underlying the present invention, an arrangement of the space relationship of the gear housing in such manner that a pedal crank shaft may be accommodated therein having a gear connection to the driven shaft, or a kickstarter device, as required.

It is preferable so to arrange the gear that parts of the kickstarter device, such as the stop member for the resting position of the kickstarter, may be secured in bearings of the pedal crank drive, such as in the bearing of a counter shaft.

Finally, in order to secure the gear housing, which mainly consists of light metal die casting, from breakage when the foot rest mounted therein receives an impact or is bent by a spill, the latter is preferably constructed resiliently. Preferably also the outer end of the footrest is connected to the part of the rest snugly fitting on the footrest spindle only by a sleeve consisting of elastic material, preferably hard rubber.

With these and other objects in view which will become apparent in the following detailed description, the present invention will be clearly understood in connection with the accompanying drawings, in which:

Figure 1 is a horizontal section through a gear having a pedal crank;

Fig. 2 is a similar section through the same gear having a footrest and a kickstarter device in a position as during the starting operation;

Fig. 3 is a fragmentary plan view in the direction of the arrow III with the cover of the gear housing removed; and Fig. 4 is a part section on the line IV—IV of Fig. 2.

Referring now to the drawings, bearings 3, 4 are disposed in a gear housing 1 and in a gear housing cover 2. As shown in Fig. 1 the pedal crankshaft 5 is mounted in these bearings. The pedal crankshaft supports a gear wheel 6 which is coupled therewith through a locking roller freewheel 7 in the direction of propulsion. In a further bearing 8 of the gear housing 1 is secured a transmission shaft 9 on which a pair of gear wheels 10, 11 is rotatably mounted. A driven shaft 12 is also mounted in the housing 1 and in the cover 2 of the housing. A pinion 13 which is in engagement with the gear wheel 11, is rigidly connected with the driven shaft 12. The gear wheel 10, on the other hand, meshes with the gear wheel 6 disposed on the pedal crankshaft 5. Finally, the driven shaft 12 carries the two gear wheels 14 and 15 of the speed change mechanism, the further construction and actuation of which is of no interest for disclosure of the present invention, and, on the outside the driving chain wheel 16.

As may be seen with a vehicle fitted with such a gear it is possible to move forward, using the pedals as an auxiliary means and starting the engine in this manner.

If the above described engine-assisted pedal cycle gear is to be converted into such for light motorcycles, the pedal crankshaft 5 is removed and a footrest spindle 17 is inserted instead into the same bearings 3, 4 (Fig. 2). This footrest spindle 17 is also rotatably mounted and simultaneously forms the kickstarter shaft. For this purpose it has a sleeve 18 which is, in its turn, firmly connected with a tooth segment 19. A helically wound torsion spring 20, which engages on the left side by one end in a recess 1' of the housing 1 and on the right side by its other end in a bore 19' on the segment 19. A locking member 22 is held by means of a bolt 21 in the bearing 8, from which the transmission shaft 9 of the gear wheels 10, 11 has been removed and replaced by the bolt 21. This locking member 22 surrounds the kickstarter shaft 17 and has a lug 22' which forms a stop for a projection 18' of the sleeve 18. Thus, the resting position of the starter device 17, 19 is secured against the action of the torsion spring 20.

Upon starting, the segment 19 comes into engagement with a gear ring 23 which may be rotated on the hub 15' of the gear wheel 15. On its inner periphery the gear ring 23 has notches 23' in which a spring-loaded pawl 24 may engage which is fitted in the recess of the hub 15' of the gear wheel 15. On the left hand the kickstarter pedal 25 is connected with the kickstarter shaft 17 and on the right hand a brake pedal 26 is mounted thereon. Finally, the kickstarter shaft 17 also carries the footrests each of which consist of a sleeve 27 with a flange 28, a mushroom-shaped outer end portion 29 and a hard rubber sleeve 30 connected with both parts by vulcanisation.

For starting the pedal 25 is trodden down. At the same time the whole kickstarter (footrest) shaft 17 twists against the action of the spring 20. The segment 19 is in engagement with the gear ring 23. The latter turns and takes with it the gear wheel 15 through the ratchet 23', 24, the gear wheel 15 being in gear connection, in its turn, with the engine again and thus starts the engine. After starting, the torsion spring 20 returns the kickstarter device to its resting position which is determined by the stop of the members 18', 22'. At the same time the segment 19 is disengaged from the gear ring 23. It is obvious that the gear wheel 15 must be disconnected by some normal means from the driven shaft 12.

In any case, with the arrangment of the gear mechanism which has been described, the vehicle equipped therewith may be constructed as an engine-assisted pedal cycle, as required, or a light motorcycle without modifying the gear housing, by the fitting of the pedal crankshaft 5 with its gear connection 6, 7, 9—11 or of the footrest shaft 17 with the kickstarter device 18—24. By resiliently constructing the footrests 27—30 the risk is countered in the second case of the gear housing 1, 2 being affected in the event of the footrests receiving an impact.

While I have disclosed one embodiment of the present invention, it is to be understood that this embodiment is given by example only and not in a limiting sense, the scope of the present invention being determined by the objects and the claims.

I claim:

1. In a transmission gear for single track vehicles, a housing, a side cover for said housing, a driven shaft rotatably mounted in said housing and said side cover, a pedal crankshaft rotatably mounted in said housing and said side cover, a freewheel on said pedal crankshaft within said housing, and a gear train acting from said pedal crankshaft to said driven shaft, a plurality of speed change mechanism gears carried by said driven shaft, one of said last mentioned gears carrying a hub having at its periphery a plurality of ratchet means, said pedal crankshaft being adapted to be replaced by a foot rest spindle rotatable in said housing and said side cover, and said gear train being adapted to be replaced by a kickstarter mechanism mounted on said footrest spindle and including a tooth sector engaging a gear ring rotatably received on said hub, in order to convert an engine-assisted pedal cycle into a light motorcycle.

2. In a transmission gear for single track vehicles, a housing, a side cover for said housing, a driven shaft rotatably mounted in said housing and said side cover, a pedal crankshaft rotatably mounted in said housing and said side cover, a freewheel on said pedal crankshaft within said housing, a first gear wheel carried by said freewheel, a second gear wheel carried by said driven shaft within said housing and a transmission shaft rotatably mounted in said housing and disposed between said driven shaft and said pedal crankshaft, an intermediate third gear means carried by said transmission shaft and operatively interconnecting said first and second gear wheels, a plurality of speed change mechanism gears carried by said driven shaft, one of said last mentioned gears carrying a hub having at its periphery a plurality of ratchet means, and said housing having a recess adjacent said pedal crankshaft, the latter being adapted to be replaced by a footrest spindle rotatably mounted in said housing and said side cover, said transmission shaft being adapted to be replaced by a bolt, said first gear means and said intermediate third gear means being adapted to be replaced by a locking member held by said bolt, the free end of said locking member surrounding said footrest spindle, and the latter carrying a tooth segment and a helical torsion spring, one end of the latter being received by said recess in the housing and the other end being received by said tooth segment, and said hub being adapted to receive rotatably thereon a gear ring for engagement with said tooth segment and for cooperation with said ratchet means, in order to convert an engine-assisted pedal cycle into a light motorcycle.

References Cited in the file of this patent
UNITED STATES PATENTS

| | | |
|---|---|---|
| 1,125,130 | Lake et al. | Jan. 19, 1915 |
| 1,125,842 | Gustafson | Jan. 19, 1915 |
| 1,786,763 | Mack | Dec. 30, 1930 |
| 2,596,512 | Thomas | May 13, 1952 |
| 2,638,175 | Poulsen | May 12, 1953 |
| 2,644,439 | Behringer | July 7, 1953 |
| 2,679,166 | Kreis | May 25, 1954 |
| 2,725,759 | Kreidler | Dec. 6, 1955 |
| 2,726,747 | Kreidler | Dec. 13, 1955 |